(12) United States Patent
Kimoto

(10) Patent No.: US 6,665,340 B1
(45) Date of Patent: Dec. 16, 2003

(54) MOVING PICTURE ENCODING/DECODING SYSTEM, MOVING PICTURE ENCODING/DECODING APPARATUS, MOVING PICTURE ENCODING/DECODING METHOD, AND RECORDING MEDIUM

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/377,317

(22) Filed: Aug. 19, 1999

(30) Foreign Application Priority Data

Aug. 21, 1998 (JP) .......................................... 10/235165

(51) Int. Cl.[7] .......................... H04N 7/12; H04N 11/02; H04N 11/04
(52) U.S. Cl. ............................. 375/240.08; 375/240.01; 375/240.24; 382/250; 382/239; 382/242
(58) Field of Search ...................... 375/240.1, 240.08, 375/240.24; 382/250, 239, 242

(56) References Cited

U.S. PATENT DOCUMENTS

| | | | | |
|---|---|---|---|---|
| 5,881,175 A | * | 3/1999 | Kim ........................... | 382/242 |
| 5,987,184 A | * | 11/1999 | Kweon ....................... | 382/250 |
| 6,069,976 A | * | 5/2000 | Kim ........................... | 382/239 |
| 6,125,142 A | * | 9/2000 | Han ........................... | 375/240.1 |
| 6,307,885 B1 | * | 10/2001 | Moon ..................... | 375/240.08 |

FOREIGN PATENT DOCUMENTS

| | | |
|---|---|---|
| JP | 10-23404 | 1/1998 |
| JP | 10-84544 | 3/1998 |

* cited by examiner

*Primary Examiner*—Chris Kelley
*Assistant Examiner*—Charles Parsons
(74) *Attorney, Agent, or Firm*—Dickstein, Shapiro, Morin & Oshinsky, LLP.

(57) ABSTRACT

A moving picture encoding/decoding system includes a moving picture encoding apparatus and moving picture decoding apparatus. The moving picture encoding apparatus has an input image encoding unit, first storage unit, shape information encoding unit, second storage unit, and padding unit. The moving picture decoding apparatus has an image decoding unit, first storage unit, shape information decoding unit, second storage unit, and padding unit. The input image encoding unit encodes an input image signal including an image object. The shape information encoding unit encodes shape information to generate encoded shape information, and generates boundary information. The padding unit identifies the outer region of the image object, calculates a pixel value, and substitutes the pixel value into the outer region. The image decoding unit refers to a reference image, and decodes encoded image data including an image object to generate an image signal. The shape information decoding unit decodes encoded shape information to generate shape information, and generates boundary information. A moving picture encoding/decoding apparatus, moving picture encoding/decoding method, and recording medium are also disclosed.

27 Claims, 14 Drawing Sheets

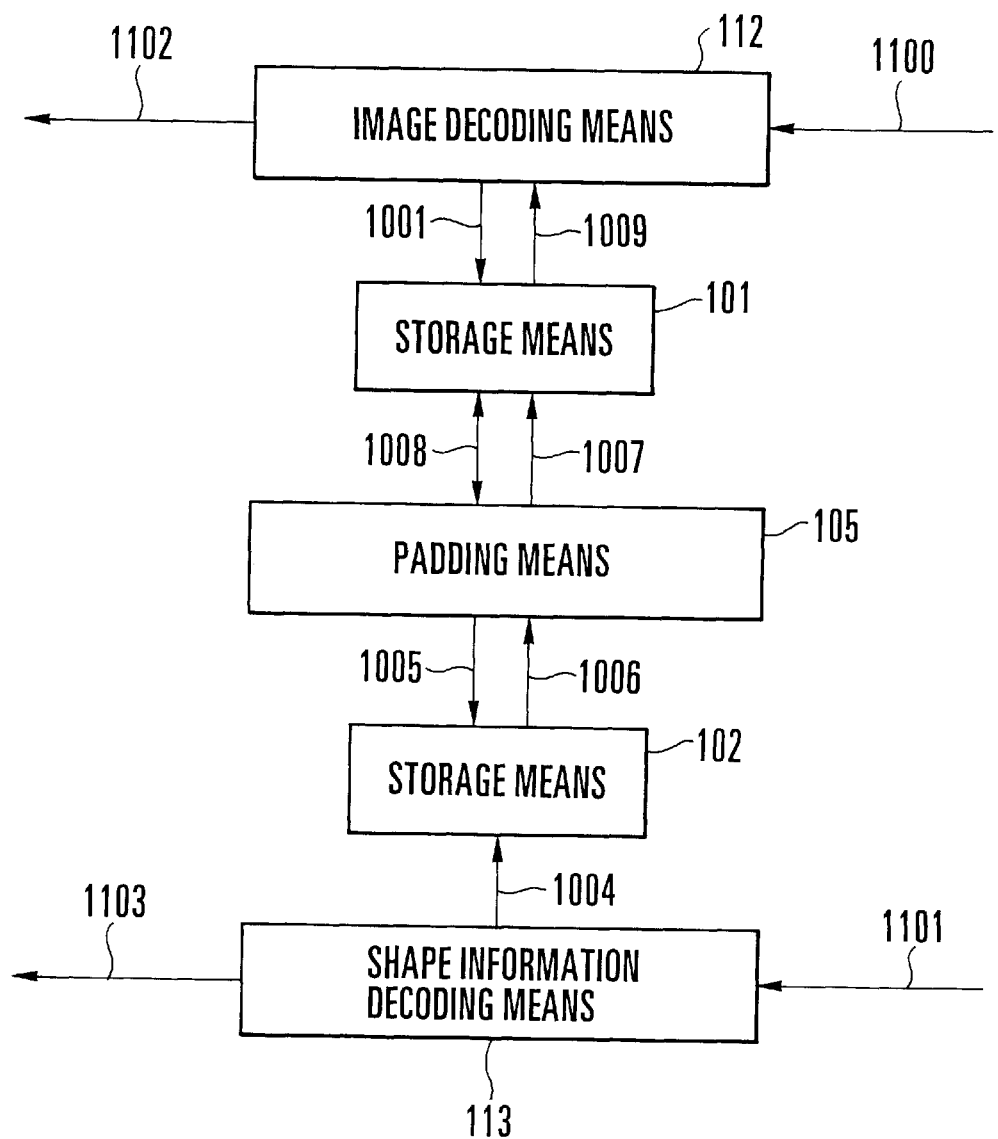
F I G. 9

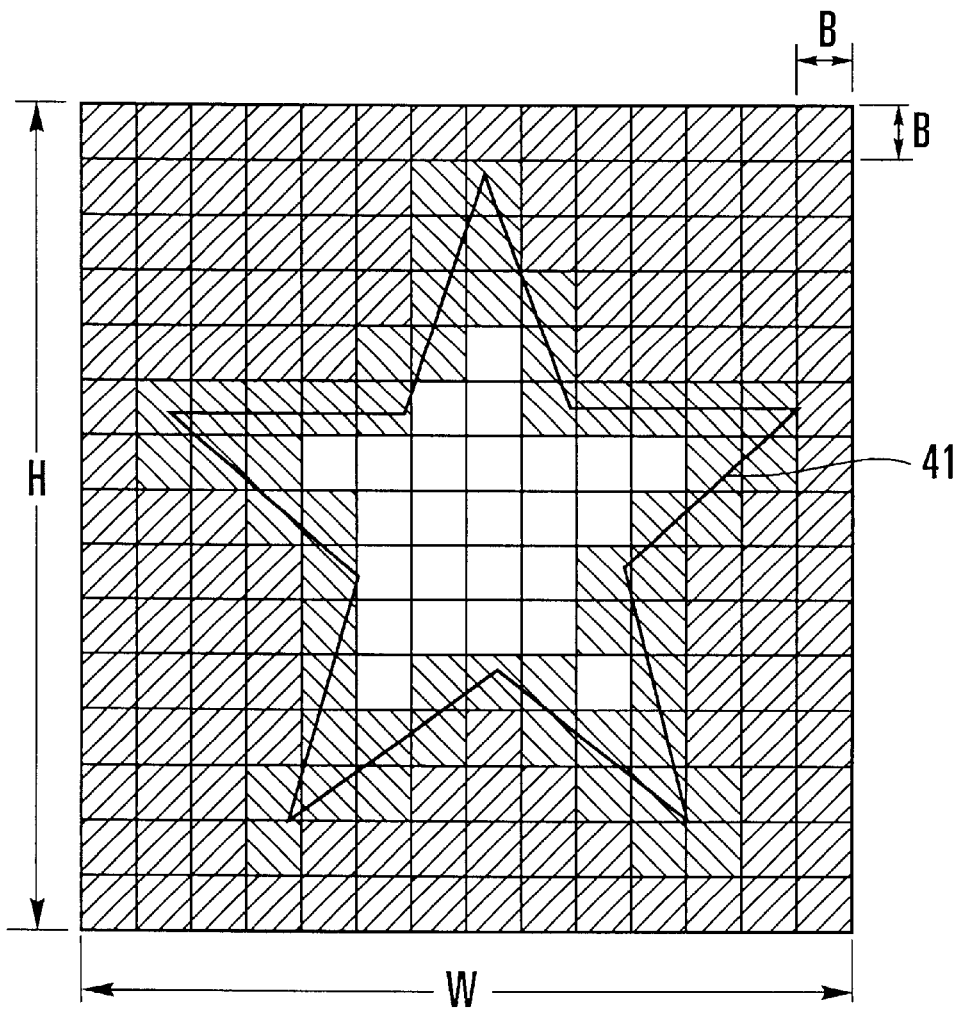
F I G. 11

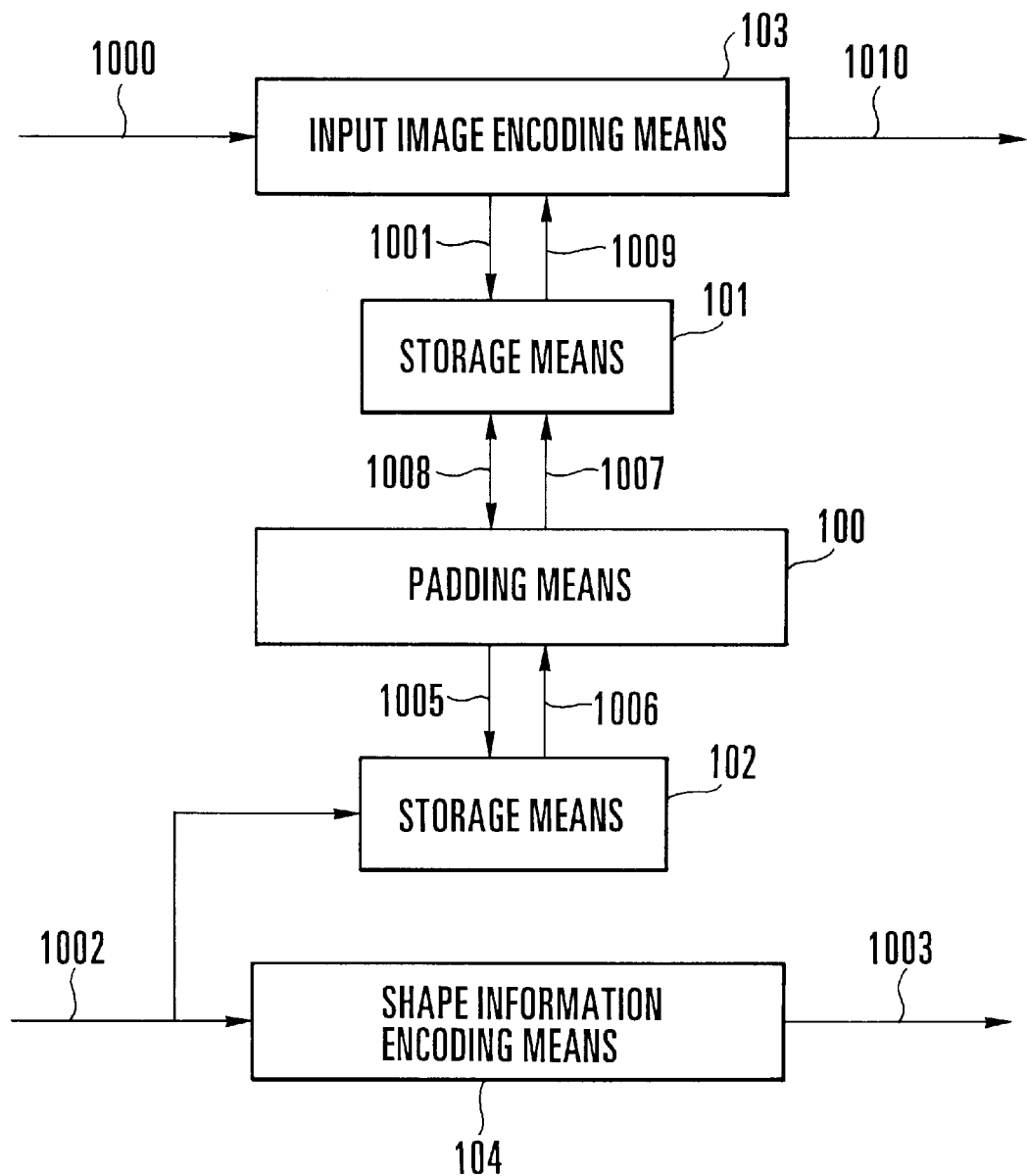
F I G. 14

MOVING PICTURE ENCODING/DECODING SYSTEM, MOVING PICTURE ENCODING/DECODING APPARATUS, MOVING PICTURE ENCODING/DECODING METHOD, AND RECORDING MEDIUM

BACKGROUND OF THE INVENTION

The present invention relates to an image processing system and, more particularly, to a moving picture encoding/decoding system, moving picture encoding/decoding apparatus, moving picture encoding/decoding method, recording medium on which a moving picture encoding/decoding program is recorded, recording medium on which a moving picture encoding program is recorded, and recording medium on which a moving picture decoding program is recorded.

In recent years, moving picture encoding extensively uses a moving picture encoding means in units of objects. The MPEG (Moving Picture Experts Group)-4, which is being standardized in ISO/IEC, also adopts encoding in units of objects. In this method, an image object (to be simply referred to as an "object") serving as a component of an image is encoded together with shape information representing the contour, and these objects are synthesized by a decoder, thereby reconstructing a target encoded image.

To encode an object with an arbitrary shape, a rectangular region including the object is set as a target encoding region, to which a conventional encoding method to a rectangular moving picture is applied.

However, when the target encoding region is encoded using "0" as a pixel value outside the object, the pixel prediction residual component on the object boundary increases along with inter-frame prediction to greatly decrease the prediction efficiency and encoding efficiency.

To solve this problem, a method called "padding" is used. According to this method, the target encoding region is encoded as a rectangular region after a pixel value near the boundary is substituted around the object. In synthesizing the object by the decoder, pixels outside the object are masked using shape information.

FIG. 14 shows the arrangement of a conventional moving picture encoding apparatus used in the ISO/IEC 14496-2 MPEG-4.

Referring to FIG. 14, an input image encoding means 103 encodes a rectangular input image 1000. A first storage means 101 stores a target padding image signal 1001 transferred from the input image encoding means 103. A second storage means 102 stores shape information 1002.

A padding means 100 transfers to the second storage means 102 an address 1005 representing a pixel position in the shape information stored in the second storage means 102, reads out the shape information 1002 stored in the second storage means 102, and identifies a pixel outside the object in the image signal stored in the first storage means 101.

The padding means 100 transfers to the first storage means 101 an address 1007 representing the pixel position outside the object in the image signal, refers to an image signal 1008 stored in the first storage means 101, calculates a pixel value to be substituted into the address 1007, and substitutes the pixel value into the address 1007.

Padding processing in the padding means 100 is realized by executing padding processing for a one-dimensional pixel string twice. FIG. 15 shows a region to be padded within the target encoding region. In a target encoding region 40, an object-including pixel string set 42 outside an object 41 is horizontally padded. Then, a region 43 not included in the pixel string set 42 is vertically padded.

By this processing, the input image encoding means 103 encodes the input image 1000 based on an image signal 1009 filled with proper pixel values outside the object. A shape information encoding means 104 encodes the shape information 1002. Encoded image data 1010 is transferred or stored together with encoded shape information 1003.

The image signal 1001 to be padded includes an input image signal transferred from the input image encoding means 103, and a reference image which is generated inside the input image encoding means 103 and used for inter-frame prediction. When the encoding apparatus pads the reference image used for inter-frame prediction, the decoding apparatus must also pad the reference image.

In identifying the object boundary in padding processing, the conventional moving picture encoding apparatus searches for all the pixels of the target encoding region twice regardless of the object shape. This results in a large arithmetic amount.

For the same reason, the moving picture decoding apparatus for performing padding processing also suffers a large arithmetic amount.

SUMMARY OF THE INVENTION

It is an object of the present invention to provide a moving picture encoding/decoding system, moving picture encoding/decoding apparatus, moving picture encoding/decoding method, and recording medium capable of reducing the arithmetic amount and increasing the processing speed.

To achieve the above object, according to the present invention, there is provided a moving picture encoding/decoding system comprising a moving picture encoding apparatus and a moving picture decoding apparatus, the moving picture encoding apparatus having input image encoding means for encoding an input image signal including an image object, first storage means for storing the image signal including the image object to be padded in the input image encoding means, and transferring the image signal to the input image encoding means if necessary, shape information encoding means for encoding shape information representing a shape of the image object to generate encoded shape information, and generating boundary information representing a boundary position of the image object, second storage means for storing the boundary information, and padding means for identifying an outer region of the image object in the image signal stored in the first storage means on the basis of the boundary information stored in the second storage means, calculating a pixel value to be substituted into the outer region, and substituting the pixel value into the region stored in the first storage means, and the moving picture decoding apparatus having image decoding means for referring to a reference image, and decoding encoded image data including an image object to generate an image signal, first storage means for storing the decoded image signal and supplying the decoded image signal as a reference image in next frame decoding processing to the image decoding means, shape information decoding means for decoding encoded shape information serving as encoded data of image object shape information to generate shape information, and generating boundary information representing a boundary position of the image object, second storage means for storing the boundary information, and padding means for identifying an outer region of the image object in the image signal stored in the first storage means on the basis of the boundary information stored in the second storage means, calculating a pixel value to be substituted into the outer region, and substituting the pixel value into the region stored in the first storage means.

BRIEF DESCRIPTION OF THE DRAWINGS

FIG. 9 is a block diagram showing the arrangement of a moving picture decoding apparatus in the third embodiment of the present invention;

FIG. 11 is a view showing an example of block classification information;

FIG. 14 is a block diagram showing the arrangement of a conventional moving picture encoding apparatus for performing padding processing.

DESCRIPTION OF THE PREFERRED EMBODIMENTS

Embodiments of the present invention will be described in detail below with reference to the accompanying drawings.

First Embodiment

Figure 1:
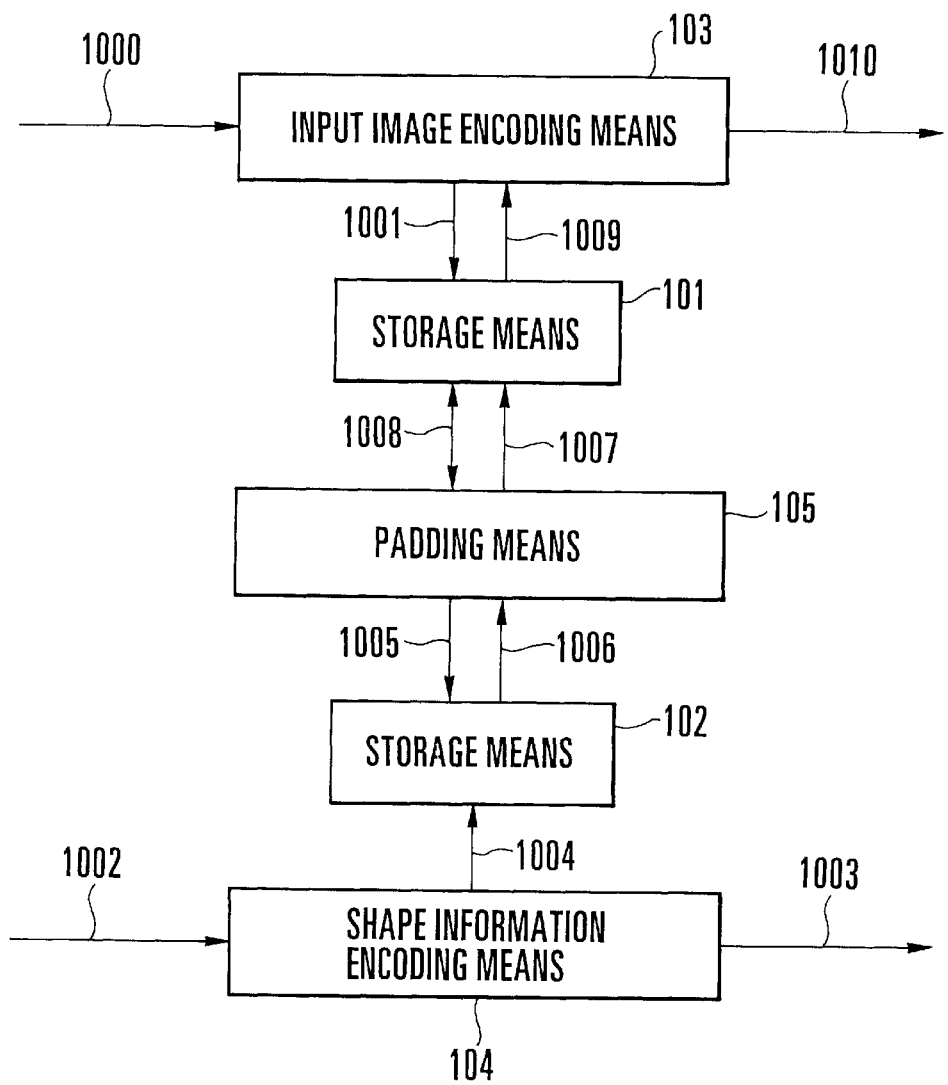
FIG. 1 is a block diagram showing the arrangement of a moving picture encoding apparatus in the first embodiment of the present invention.

FIG. 1 shows the arrangement of a moving picture encoding apparatus according to the first embodiment of the present invention. The moving picture encoding apparatus in FIG. 1 comprises an input image encoding means 103 for encoding an input image signal 1000 including an image object, a first storage means 101 for storing the image signal including the image object to be padded in the input image encoding means 103, and transferring the image signal to the input image encoding means 103 if necessary, a shape information encoding means 104 for encoding shape information 1002 representing the shape of the image object to generate encoded shape information 1003, and generating boundary information 1004 representing the boundary position of the image object, a second storage means 102 for storing the boundary information, and a padding means 105 for identifying the outer region of the image object in the image signal stored in the first storage means 101 on the basis of the boundary information stored in the second storage means 102, calculating a pixel value to be substituted into the outer region, and substituting the pixel value into the region stored in the first storage means 101.

In the following description, the present invention is applied to padding processing for a reference image used for inter-frame prediction. Also when moving picture encoding processing is done after padding an input image signal, the same padding processing as the first embodiment can be applied.

The input image encoding means 103 encodes the input image signal 1000 to generate encoded image data 1010. The input image encoding means 103 generates an image signal 1001 representing the decoded image of the current frame, and stores the image signal 1001 in the first storage means 101. In encoding the next frame, the input image encoding means 103 refers to the image signal 1001 as a reference image 1009 to perform inter-frame prediction.

The shape information encoding means 104 encodes the shape information 1002 representing the shape of the image object in the input image signal 1000, thereby generating the encoded shape information 1003. At the same time, the shape information encoding means 104 transfers to the second storage means 102 the boundary information 1004 representing the boundary position of the object within the target encoding region.

The padding means 105 designates an address 1005 in order to switch boundary information referred to in each processing stage, and receives corresponding boundary information 1006 from the second storage means 102. The padding means 105 refers to the boundary information 1006 to identify an outer region outside the object in the image signal stored in the first storage means 101, calculates a padding value as a pixel value to be substituted into the region, and substitutes the padding value into the region in the image signal of the first storage means 101.

The padding means 105 transfers to the first storage means 101 an address 1007 representing the position of a pixel referred to in padding value calculation, or the position of a pixel to be substituted. The padding means 105 reads out and writes a pixel value 1008.

Figure 2:
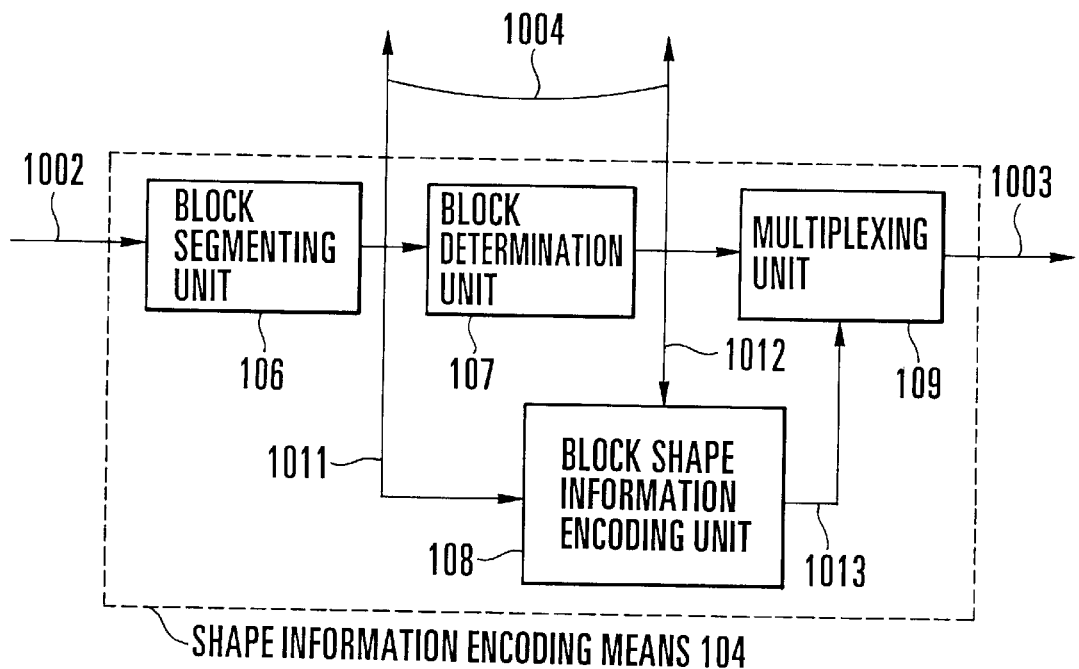
FIG. 2 is a block diagram showing the arrangement of a shape information encoding means in the first embodiment of the present invention.

FIG. 2 shows the arrangement of the shape information encoding means 104 for outputting encoded shape information defined in the ISO/IEC 14496-2 MPEG-4. The shape information encoding means 104 in FIG. 2 comprises a block segmenting unit 106 for segmenting the shape information 1002 into a plurality of blocks, a block determination unit 107 for referring to segmented block shape information 1011 to generate block classification information 1012 representing whether the block is outside or inside the image object or on the boundary, a block shape information encoding unit 108 for referring to the block classification information 1012, and when the block is on the boundary of the image object, encoding the block shape information 1011, and a multiplexing unit 109 for multiplexing the block classification information 1012 and encoded block shape information 1013 to generate the encoded shape information 1003. The block classification information 1012 and block shape information 1011 are transferred as the boundary information 1004 to the second storage means 102.

The block segmenting unit 106 segments the shape information 1002 into a plurality of block shape information 1011 in accordance with a plurality of blocks prepared by dividing the target encoding region. The block segmenting unit 106 sends the block shape information 1011 to the block determination unit 107.

The block determination unit 107 refers to each block shape information 1011 to generate block classification information 1012 representing whether the block is inside or outside the image object or on the object boundary.

The block shape information encoding unit 108 refers to the block classification information 1012, and when the block is on the boundary of the image object, encodes the block shape information 1011 to generate the encoded block shape information 1013.

The multiplexing unit 109 multiplexes the block classification information 1012 and encoded block shape information 1013 into the encoded shape information 1003.

The block classification information 1012 and block shape information 1011 are transferred as the boundary information 1004 to the second storage means 102.

When the target encoding region is a rectangle with a width W and height H, and the segmented block is a square with a side B, the block classification information is given by a matrix of the width W/B and height H/B, as shown in FIG. 11.

In FIG. 11, a block hatched from the upper right end of the block to the lower left end, a white block, and a block hatched from the upper left end of the block to the lower right end are respectively a block outside an image object 41, a block inside the image object 41, and a block on the boundary of the image object 41.

Figure 3:
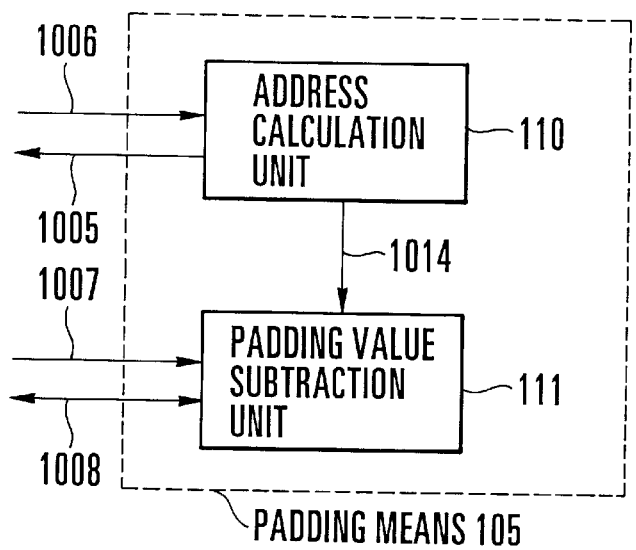
FIG. 3 is a block diagram showing the arrangement of a padding means in the first embodiment of the present invention.

FIG. 3 shows the arrangement of the padding means 105. The padding means 105 in FIG. 3 comprises an address calculation unit 110 for referring to the block classification information stored in the second storage means 102, and only when the block is on the boundary of the image object, referring to the block shape information stored in the second storage means 102 to calculate an address 1014 representing a pixel position in the outer region from the block classification information and block shape information, and a padding value substitution unit 111 for referring to the image signal stored in the first storage means 101 to calculate a pixel value corresponding to the address 1014, and substituting the pixel value into the address in the image signal stored in the first storage means 101.

Figure 4:
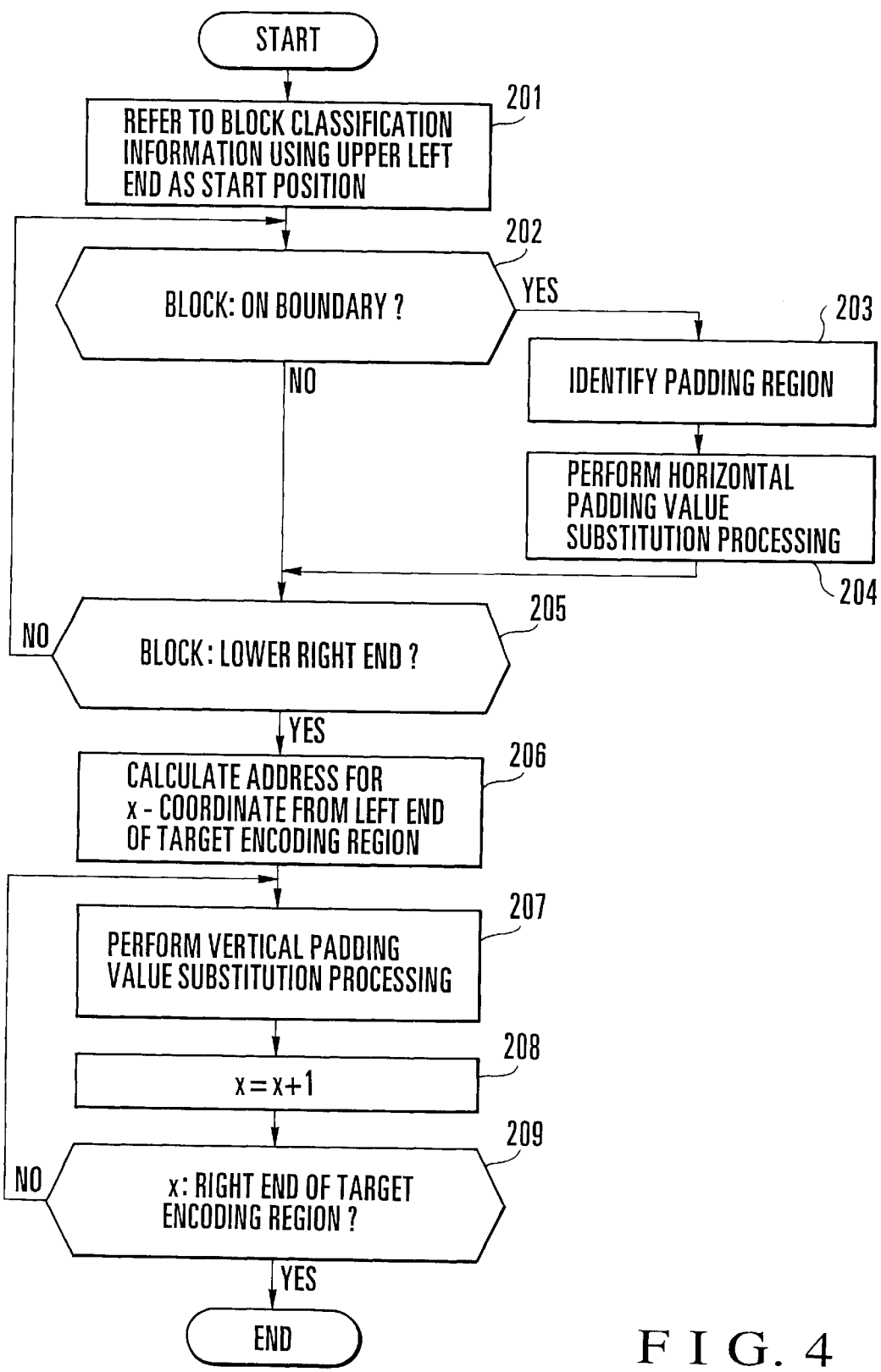
FIG. 4 is a flow chart showing operation of the padding means in the first embodiment of the present invention.

FIG. 4 shows operation of the padding means 105. Operation of the padding means 105 will be explained with reference to FIGS. 1, 3, and 4.

The address calculation unit 110 starts referring to the boundary information 1006 (block classification information 1012) stored in the second storage means 102 using the upper left end of the target encoding region as a start position (step 201).

The address calculation unit 110 determines based on the block classification information 1012 whether the block is on the boundary of the image object (step 202). If YES in step 202, the address calculation unit 110 reads out corresponding boundary information 1006 (block shape information 1011), and identifies a padding region to be padded (step 203). The padding value substitution unit 111 performs padding value substitution processing to a horizontal pixel string (step 204).

The processing from steps 202 to 204 is repeated till the completion of search for the block classification information (step 205).

After that, the address calculation unit 110 restarts calculating addresses from the left end of the target encoding region as a start position (step 206). The padding value substitution unit 111 performs padding value substitution processing to a vertical pixel string (step 207).

The padding value substitution position is updated (step 208), and vertical padding processing (step 207) is repeated until the target pixel string reaches the right end of the target encoding region (step 209).

Padding processing will be sequentially explained.

Figure 5:
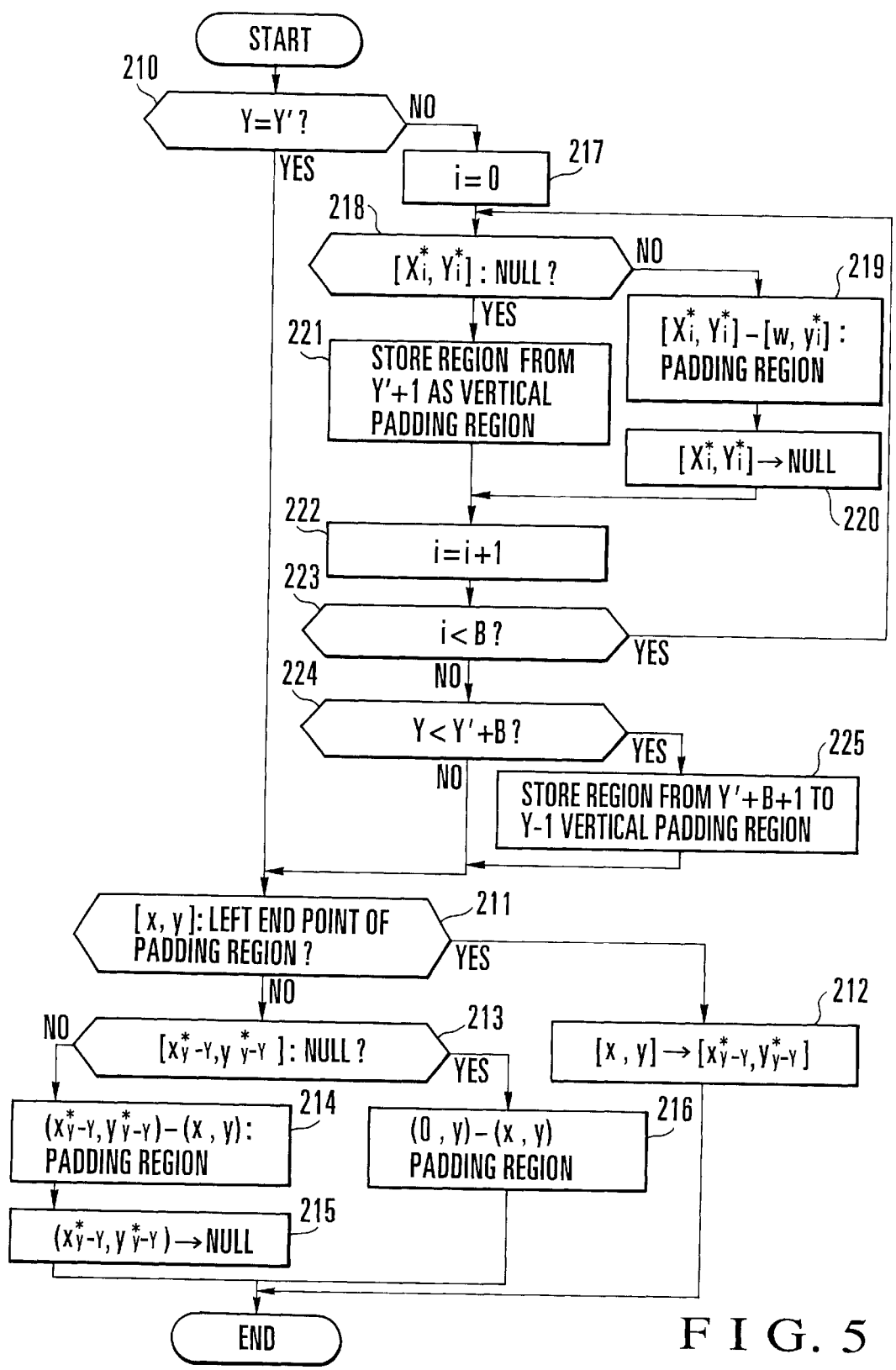
FIG. 5 is a flow chart showing padding region identification means in FIG. 4 in detail.
Figure 12:
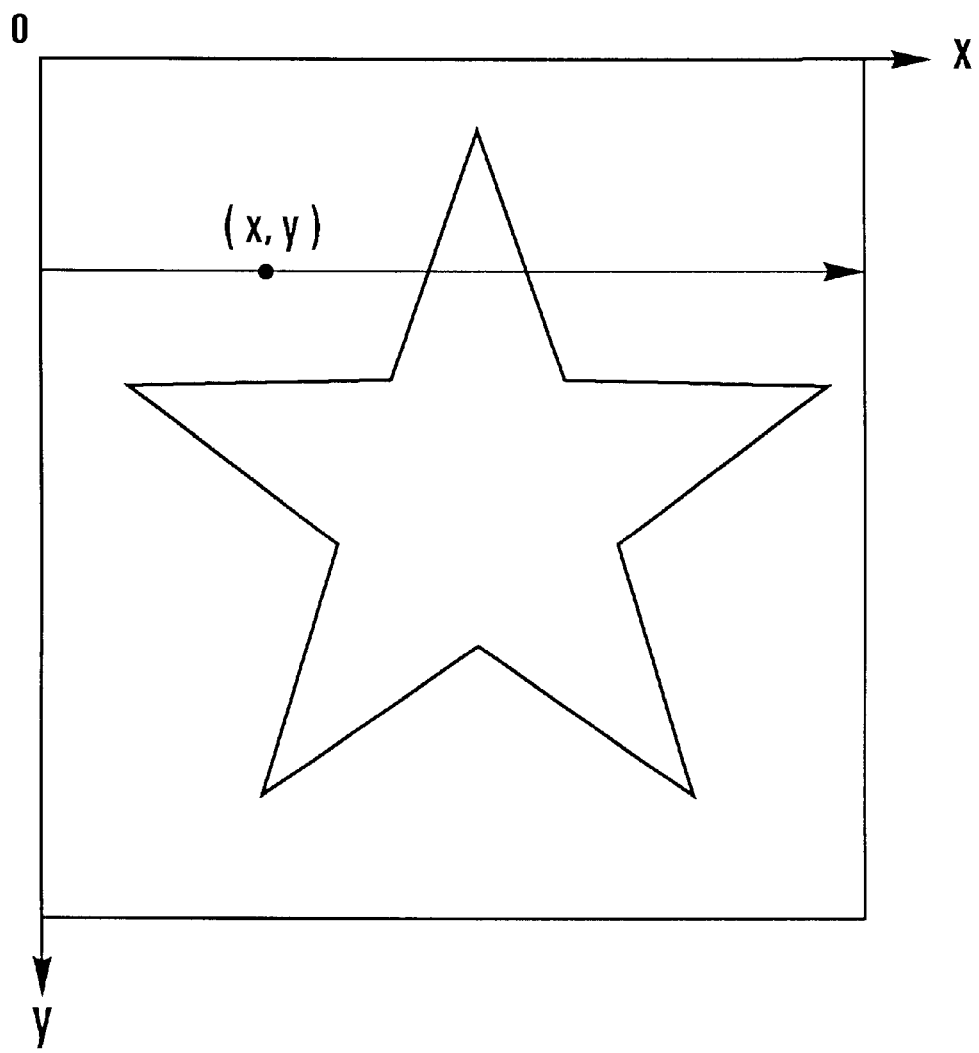
FIG. 12 is a view showing the coordinate system in the target encoding region.

FIG. 5 shows padding region identification processing (step 203) in FIG. 4 in detail. In FIG. 5, Y and Y' respectively represent the y-coordinate at the upper left end point of the block on the boundary, and the y-coordinate at the upper left end point of a previously referred block. FIG. 12 shows the coordinates in the target encoding region. The upper left end point of the target encoding region is defined as the origin, and the horizontal and vertical directions are respectively defined as x- and y-axes.

The address calculation unit 110 comprises B registers 0 to B−1 in order to store the left end point of an identified padding region, and the registers 0 to B−1 store corresponding pixel coordinates. Coordinates (xi, yi) are stored in the register i. Further, the address calculation unit 110 incorporates a memory for storing the y-coordinate representing a padding region subjected to vertical padding processing.

The address calculation unit 110 refers to the boundary information 1006 (block classification information 1012) to determine Y and compare it with Y' (step 210).

If Y=Y', the address calculation unit 110 searches for boundary information 1006 (block shape information 1011) corresponding to the block for each pixel, and identifies coordinates at the right and left ends of the padding region. A pixel outside the object that is adjacent to a right pixel inside the object is defined as the right end of the padding region, and a pixel outside the object that is adjacent to a left pixel inside the object is defined as the left end of the padding region.

If the coordinates (x, y) indicate the left end point (YES in step 211), the address calculation unit 110 stores the coordinates (x, y) in a corresponding register y-Y (step 212).

If the coordinates (x, y) indicate the right end point (NO in step 211), the address calculation unit 110 checks whether the register y-Y stores a corresponding left end point (step 213).

If the register y-Y stores the coordinates, the address calculation unit 110 sets a region from (xi, yi) to (x, y) subject to i=y-Y as a padding region, calculates corresponding addresses 1014 in the image signal stored in the storage means 101, and transfers the addresses 1014 to the padding value substitution unit 111 (step 214).

Note that, at this time, yi=y. Then, the address calculation unit 110 resets the register y-Y (step 215).

If the register y-Y does not store the coordinates, the address calculation unit 110 sets a region from the left end coordinates (0, y) of the target encoding region to (x, y) as a padding region, calculates corresponding addresses 1014, and transfers them to the padding value substitution unit 111 (step 216).

If the Y>Y' in step 210, the address calculation unit 110 checks whether coordinates are stored in each register before step 211 (step 218).

If coordinates are stored in the register i (NO in step 218), the address calculation unit 110 sets a region from (xi, yi) to the right end coordinates (W, yi) of the target encoding region as a padding region, calculates corresponding addresses 1014, transfers them to the padding value substitution unit 111 (step 219), and resets the register i (step 220).

If no coordinates are stored in the register i (YES in step 215), this means that a pixel string having a y-coordinate of (Y'+i) does not include any pixel inside the image object.

The address calculation unit 110 sets and stores a region from the y-coordinate of Y'+i as a vertical padding region in the internal memory (step 221).

The address calculation unit 110 repeats the above processing from the register 0 (step 217) to the register B−1 (steps 222 and 223).

The address calculation unit 110 checks whether Y is larger than Y'+B (step 224). If Y>Y'+B, this means that image strings not including the object successively exist between the lower end of a block having immediately undergone padding region identification processing and the upper end of a block undergoing padding region identification processing. The address calculation unit 110 sets a region from a y-coordinate of Y'+B+1 to Y−1 as a vertical padding region, and stores these y-coordinates in the internal memory (step 225).

Figure 6:
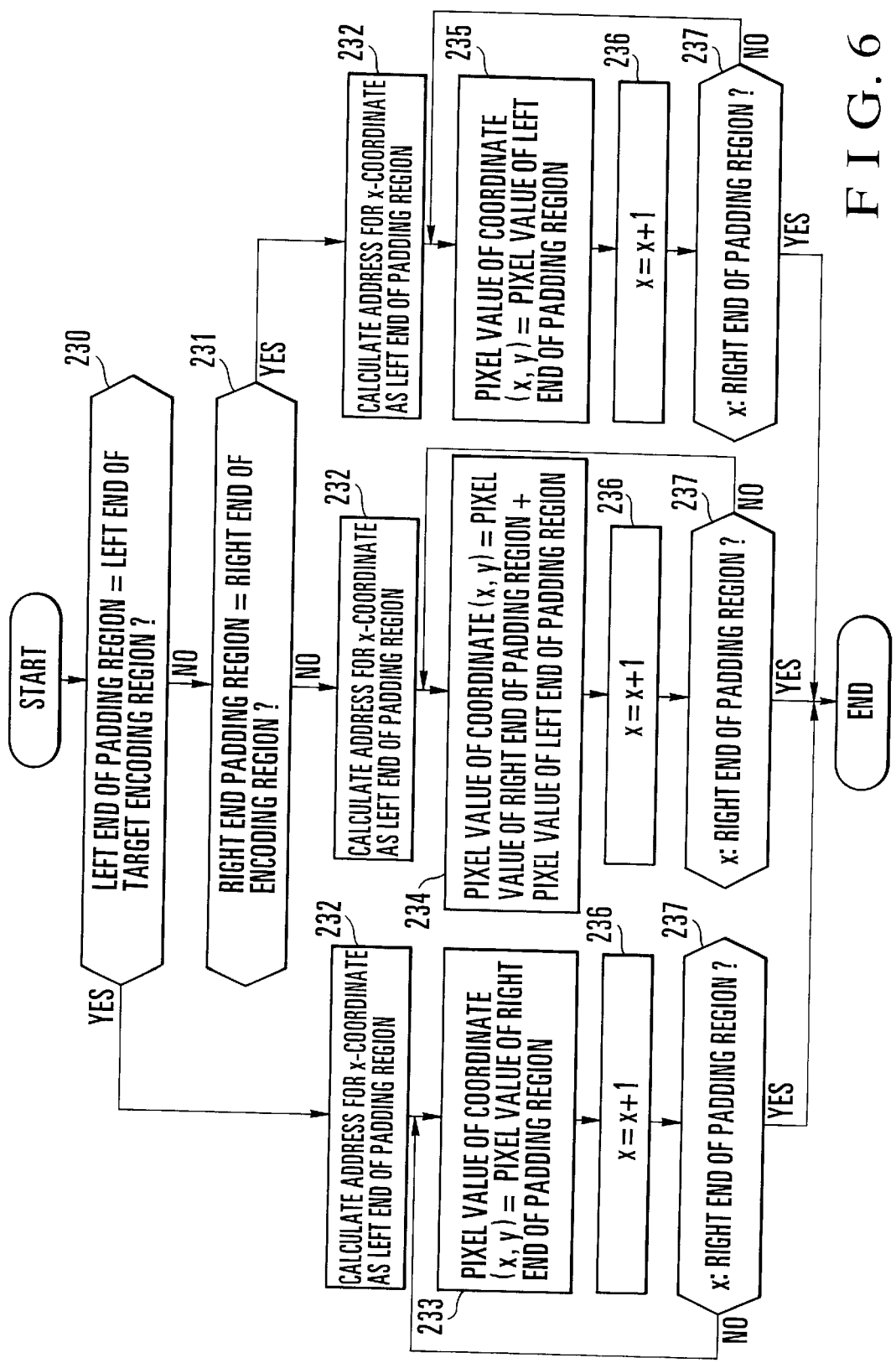
FIG. 6 is a flow chart showing horizontal padding value substitution processing in FIG. 4 in detail.

FIG. 6 shows horizontal padding value substitution processing (step 204) in FIG. 4 in detail. Although padding value substitution processing shown in FIG. 6 is described in the ISO/IEC 14496-2 MPEG-4, the present invention can also be applied to another padding value substitution processing.

If the left end point of the padding region is the left end point of the target encoding region (YES in step 230), the padding value subtraction unit 111 sets a pixel value 1008 immediately adjacent to the right end of the padding region as a padding value, and substitutes this padding value into a corresponding position in the image signal stored in the first storage means 101 (step 233).

If the right end point of the padding region is the right end point of the target encoding region (YES in step 231), the padding value subtraction unit 111 sets a pixel value 1008 immediately adjacent to the left end of the padding region as a padding value, and substitutes this padding value into a corresponding position in the image signal stored in the first storage means 101 (step 235).

If neither the two end points of the padding region are the end points of the target encoding region (NO in step 231), the padding value subtraction unit 111 sets the average of the pixel values 1008 respectively immediately adjacent to the right and left ends of the padding region as padding values, and substitutes these padding values into corresponding positions in the image signal stored in the first storage means 101 (step 234).

The search section, padding region, and padding value in the horizontal pixel string will be explained with reference to an example shown in FIG. 13.

Figure 13:
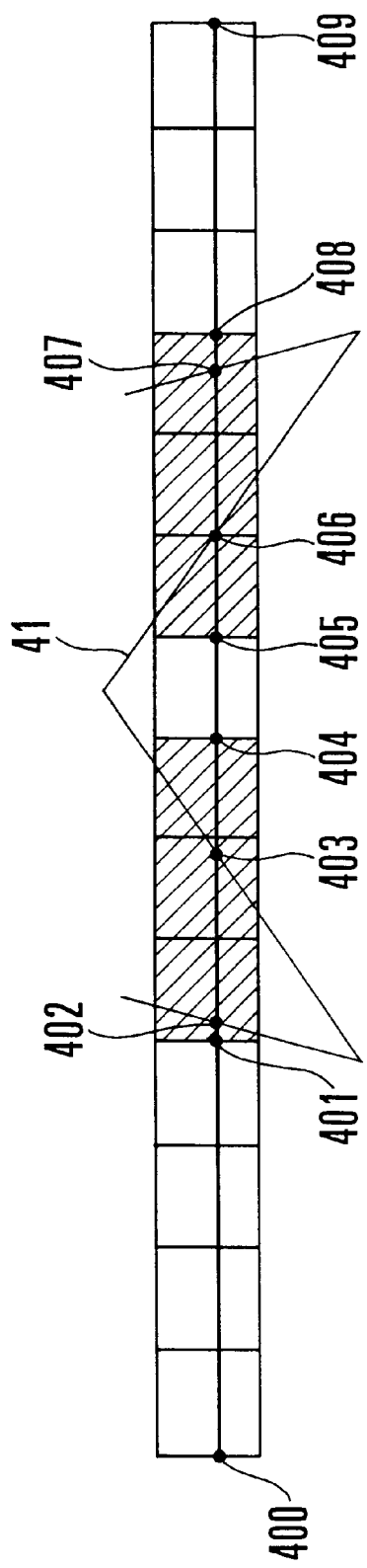
FIG. 13 is a view showing an example of the search section and padding region in a horizontal pixel string.
Figure 15:
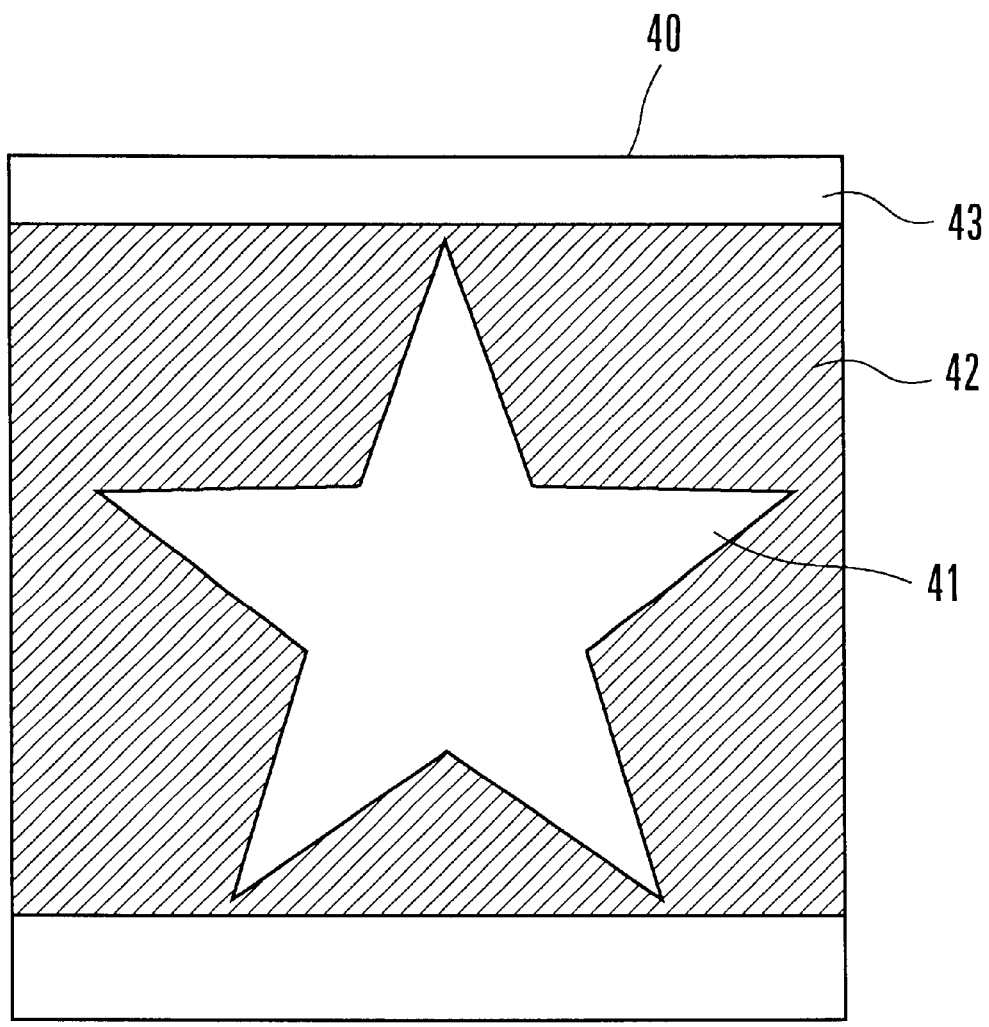
FIG. 15 is a view showing an example of a padding region corresponding to an image object.

A polygonal line 41 in FIG. 13 represents the boundary of the image object. In FIG. 13, blocks aligned in the lateral direction represent block classification information, and hatched blocks are on the object boundary. Points 400 and 409 indicate the left and right ends of the pixel string in the target encoding region. In this example, padding processing of a pixel string from the pixels 400 to 409 will be described. On this pixel string, search targets are regions inside boundary blocks, i.e., a section from the pixels 401 to 404 and a section from the pixels 405 to 408. The pixels 402, 403, 406, and 407 serving as the end points of these padding regions are identified by the above-described search processing. From the above operation, the pixel value of the pixel 402, the average of the pixel values of the pixels 403 and 406, and the pixel value of the pixel 407 are respectively substituted as padding values into the padding region from the pixels 400 to 402, the padding region from the pixels 403 to 406, and the padding region from the pixels 407 to 409.

Referring back to FIG. 4, after padding region identification processing and horizontal padding value substitution processing are completed, the address calculation unit 110 defines the left end of the target encoding region as the start position of vertical padding processing (step 206).

The padding value subtraction unit 111 performs padding value substitution processing of sequentially substituting the values of adjacent pixels padded in units of vertical pixel strings (step 207). Padding processing for each vertical pixel string is the same as horizontal padding value substitution processing shown in FIG. 6 except that the padding directions are different from each other, and a description thereof will be omitted.

In the first embodiment, the encoded shape information 1003 output from the shape information encoding means 104 is made up of the block classification information and encoded block shape information. The present invention is also applied to another shape information encoding method using the outline of the object, e.g., a method of expressing the outline of the image object with a simple geometric figure.

When shape information encoding does not use any outline information, the shape information encoding means 104 newly comprises a means for identifying a block position on the object boundary at the same time as encoding the shape, and transfers the identified boundary information 1004 to the second storage means 102. Even this arrangement can implement the present invention.

In the first embodiment, the entire region of the target encoding region outside the image object undergoes padding processing. The present invention can also be applied when the padding region is limited within a motion vector detection range in motion-compensated inter-frame prediction encoding. In this case, if an identified padding region exceeds the detection range, only a block within the detection range from the object boundary undergoes padding value substitution processing.

As described above, the present invention can reduce the arithmetic amount and increase the processing speed by limiting the pixel search region in padding processing. This is because the present invention uses boundary information obtained by shape information encoding and omits search for a block not on the boundary of the image object.

In conventional padding processing, all the pixels in the target encoding region are searched twice, as described above. To the contrary, in the present invention, pixels are searched only in blocks on the object boundary, e.g., blocks hatched from the upper left end to the lower right end in FIG. 11.

In processing necessary for reducing pixel search, outline information of the image object is obtained by shape information encoding without requiring any additional arithmetic amount, and search for the outline information only spends a smaller arithmetic amount than search for the pixel in the target encoding region. Therefore, the present invention can remarkably reduce the arithmetic amount.

Second Embodiment

Figure 7:
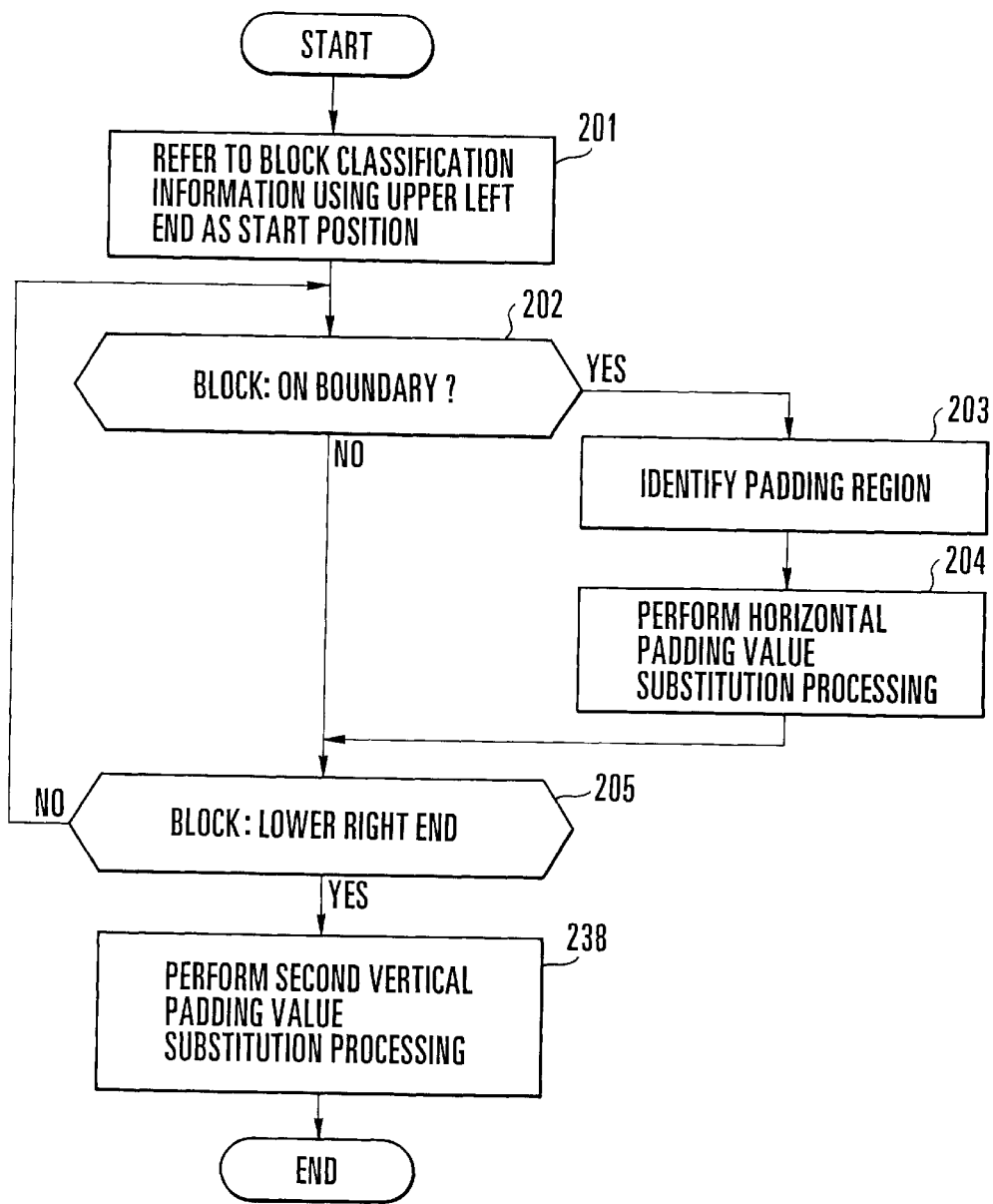
FIG. 7 is a flow chart showing operation of the padding means in the second embodiment of the present invention.

The second embodiment of the present invention will be described. In the second embodiment, a moving picture encoding apparatus has the same arrangement as in the first embodiment except for processing in a padding means 105. FIG. 7 shows operation of the padding means 105 in the second embodiment of the present invention. The same reference numerals as in FIG. 4 denote the same parts.

Figure 8:
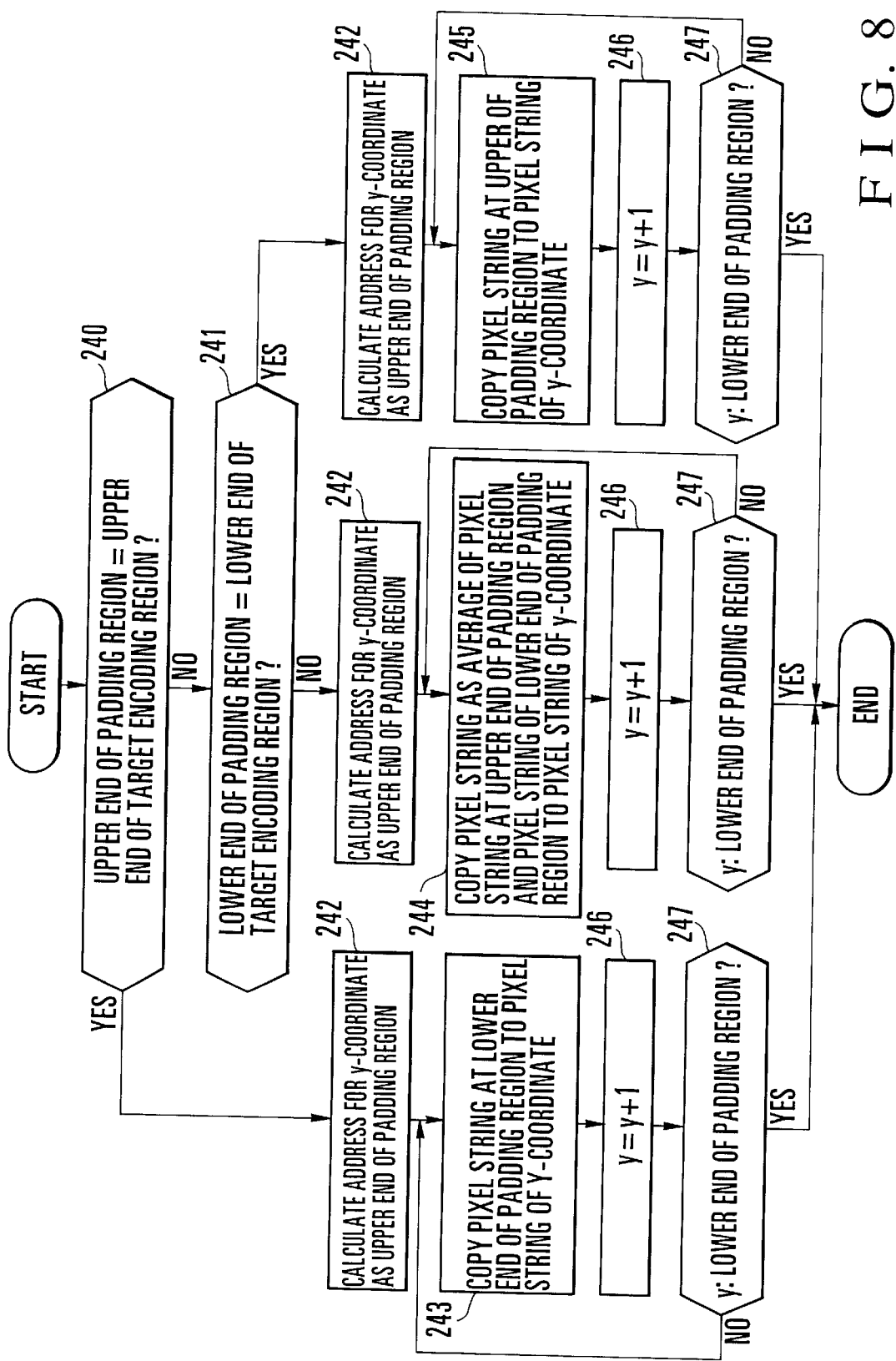
FIG. 8 is a flow chart showing vertical padding value substitution processing in FIG. 7 in detail.

The first embodiment applies horizontal padding value substitution processing to the vertical one except for the direction. However, the second embodiment adopts different padding processing from the horizontal one (step 238). FIG. 8 shows vertical padding value substitution processing in detail.

A padding value subtraction unit 111 refers to an address 1014 transferred from an address calculation unit 110, and copies pixel strings to a vertical padding region one by one, thereby achieving padding value substitution processing.

If the upper end of the padding region is the upper end of the target encoding region (YES in step 240), the padding value subtraction unit 111 copies a pixel string below the lower end of the padding region to respective pixel strings in the padding region (step 243).

If the lower end of the padding region is the lower end of the target encoding region (YES in step 241), the padding value subtraction unit 111 copies a pixel string above the upper end of the padding region to respective pixel strings in the padding region (step 245).

If neither the two ends of the padding region are the boundary of the target encoding region (NO in step 241), the padding value subtraction unit 111 averages pixels having the same x-coordinate from a pixel string above the upper end of the padding region and a pixel string below the lower end of the padding region, and copies the newly generated pixel string to pixel strings in the padding region (step 244).

The second embodiment of the present invention can copy pixel values successively stored in the memory to another memory space, and can further increase the processing speed.

Third Embodiment

FIG. 9 shows the arrangement of a moving picture decoding apparatus in the third embodiment of the present invention. The moving picture decoding apparatus in FIG. 9 comprises an image decoding means 112 for referring to a reference image, and decoding encoded image data 1100 including an image object into an image signal 1102, a first storage means 101 for storing the decoded image signal and supplying it as a reference image in next frame decoding processing to the image decoding means, a shape information decoding means 113 for decoding encoded shape information 1101 serving as encoded data of image object shape information to generate shape information 1103, and generating boundary information 1004 representing the boundary position of the image object, a second storage means 102 for storing the boundary information, and a padding means 105 for identifying the outer region of the image object in the image signal stored in the first storage means 101 on the basis of the boundary information stored in the second storage means 102, calculating a pixel value to be substituted into the outer region, and substituting the pixel value into the region stored in the first storage means 101.

The moving picture decoding apparatus comprises the image decoding means 112 and shape information decoding means 113 in place of the input image encoding means 103 and shape information encoding means 104 in the moving picture encoding apparatus shown in FIG. 1.

The image decoding means 112 decodes the encoded image data 1100 to generate the output image signal 1102. The output image signal 1102 has a target encoding region represented by a rectangular outer frame, and includes an image object with an arbitrary shape.

The image decoding means 112 stores the output image signal of the current frame in the first storage means 101. The image decoding means 112 uses this image signal as a reference image 1009 for inter-frame prediction in decoding the next frame.

The shape information decoding means 113 decodes the encoded shape information 1101 to output the shape information 1103 of the image object, and stores the boundary information 1004 in the second storage means 102.

The padding means 105 sends a read request 1005 to the second storage means 102 every processing unit for padding processing, and receives boundary information 1006 from the storage means 102.

The padding means 105 refers to the boundary information 1006 to calculate addresses 1007 representing a region outside the image object in the image signal stored in the first storage means 101, and refers to an image signal 1001 stored in the first storage means 101 to calculate a pixel value 1008 to be substituted into the region, and substitutes the pixel value 1008 to the region in the first storage means 101.

Detailed processing in the padding means 105 is the same as in the padding means 105 of the first or second embodiment, and a description thereof will be omitted.

Figure 10:
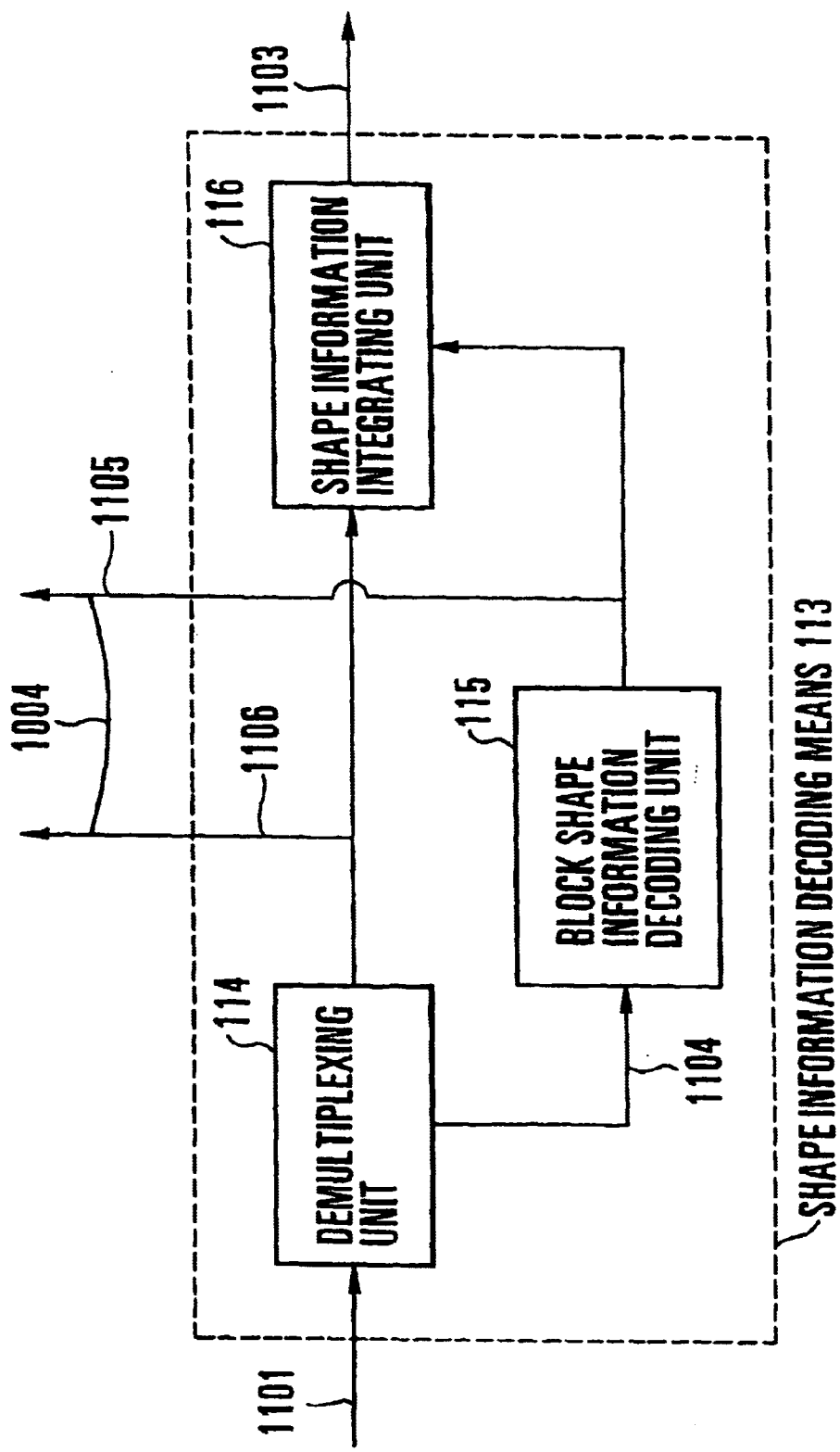
FIG. 10 is a block diagram showing the arrangement of a shape information decoding means in the third embodiment of the present invention.

FIG. 10 shows the arrangement of the shape information decoding means 113. A demultiplexing unit 114 demultiplexes the encoded shape information 1101 into block classification information 1106 and encoded block shape information 1104.

A block shape information decoding unit 115 decodes the encoded block shape information 1104 to generate block shape information 1105.

A shape information integrating unit 116 refers to the block classification information 1106 and block shape information 1105 to generate the shape information 1103 of the entire image object.

The block classification information 1106 and block shape information 1105 are transferred as the boundary information 1004 to the second storage means 102.

In this way, the moving picture decoding apparatus can attain the same effects as the moving picture encoding apparatus of the first embodiment.

In the third embodiment, the entire region of the target encoding region outside the image object undergoes padding processing. The present invention can also be applied when the padding region is limited within a motion vector detection range in motion-compensated inter-frame prediction encoding. In this case, if an identified padding region exceeds the detection range, only a block within the detection range from the object boundary undergoes padding value substitution processing.

The third embodiment may adopt the padding means 105 described in the second embodiment.

Fourth Embodiment

The above-described moving picture encoding apparatus can be realized by a computer. In this case, a moving picture encoding program for realizing the moving picture encoding method of the present invention is loaded from a recording medium such as a flexible disk, CD-ROM, or memory card on which this program is recorded to the memory of a computer (the computer may be a digital signal processor for image processing). By executing this program, the moving picture encoding apparatus can be realized.

Similarly, the moving picture decoding apparatus can be realized by a computer. In this case, a moving picture decoding program for realizing the moving picture decoding method of the present invention is loaded from a recording medium on which this program is recorded to the memory of the computer. By executing this program, the moving picture decoding apparatus can be realized.

What is claimed is:

1. A moving picture encoding/decoding system comprising a moving picture encoding apparatus and a moving picture decoding apparatus, said moving picture encoding apparatus including:

input image encoding means for encoding an input image signal including an image object;

first storage means for storing the image signal including the image object;

shape information encoding means for encoding shape information representing a shape of the image object to generate encoded shape information, and generating boundary information representing a boundary position of the image object;

second storage means for storing the boundary information; and first padding means for identifying an outer region of the image object in the image signal stored in said first storage means on the basis of the boundary information stored in said second storage means, calculating a pixel value to be substituted into the outer region, the calculating being performed using information from pixels at the boundary position and from no other pixels of the image object and substituting the pixel value into the outer region stored in said first storage means, and said moving picture decoding apparatus including:

image decoding means for referring to a reference image, and decoding encoded image data including the image object to generate a decoded image signal;

third storage means for storing the decoded image signal and supplying the decoded image signal as a reference image in a next frame decoding processing to said image decoding means;

shape information decoding means for decoding encoded shape information serving as encoded data of image object shape information to generate shape information, and generating boundary information representing a boundary position of the image object;

fourth storage means for storing the boundary information; and second padding means for identifying the outer region of the image object in the image signal stored in said third storage means on the basis of the boundary information stored in said fourth storage means, calculating a pixel value to be substituted into the outer region the calculating being performed using information from pixels at the boundary position and from no other pixels of the image object, and substituting the pixel value into the outer region stored in said third storage means.

2. A moving picture encoding apparatus comprising:

input image encoding means for encoding an input image signal including an image object;

first storage means for storing the image signal including the image object;

shape information encoding means for encoding shape information representing a shape of the image object to generate encoded shape information, and generating boundary information representing a boundary position of the image object;

second storage means for storing the boundary information; and padding means for identifying an outer region of the image object in the image signal stored in said first storage means on the basis of the boundary information stored in said second storage means, calculating a pixel value to be substituted into the outer region, the calculating being performed using information from pixels at the boundary position and from no other pixels of the image object and substituting the pixel value into the outer region stored in said first storage means.

3. An apparatus according to claim 2, wherein the image signal which is stored in said first storage means is an input image.

4. An apparatus according to claim 2, wherein the image signal which is stored in said first storage means is a reference image in inter-frame prediction.

5. A system according to claim 1, wherein said shape information encoding means comprises:

a block segmenting unit for segmenting the shape information into a plurality of blocks;

a block determination unit for referring to the plurality of blocks to generate block classification information representing whether each block is outside or inside the image object or on a boundary;

a block shape information encoding unit for referring to the block classification information, and when a particular block is on the boundary of the image object, encoding the block shape information associated with the particular block; and a multiplexing unit for multiplexing the block classification information and the encoded block shape information to generate encoded shape information, wherein the block classification information and the block shape information comprise the boundary information in said second storage means.

6. A system according to claim 5, wherein each padding means comprises:

an address calculation unit for referring to the block classification information stored in said second storage means, and only when the particular block is on the boundary of the image object, referring to the block shape information stored in said second storage means to calculate an address representing a pixel position in the outer region from the block classification information and the block shape information; and a padding value substitution unit for referring to the image signal stored in said first storage means to calculate a pixel value corresponding to the address, and substituting the pixel value into the address in the image signal stored in said first storage means.

7. A moving picture decoding apparatus for performing padding processing comprising:

image decoding means for referring to a reference image, and decoding encoded image data including an image object to generate a decoded image signal;

first storage means for storing the decoded image signal and supplying the decoded image signal as a reference image in a next frame decoding processing to said image decoding means;

shape information decoding means for decoding encoded shape information serving as encoded data of image object shape information to generate shape information, and generating boundary information representing a boundary position of the image object;

second storage means for storing the boundary information; and padding means for identifying an outer region of the image object in the image signal stored in said first storage means on the basis of the boundary information stored in said second storage means, calculating a pixel value to be substituted into the outer region, the calculating being performed using information from pixels at the boundary position and from no other pixels of the image object and substituting the pixel value into the outer region stored in said first storage means.

8. An apparatus according to claim 7, wherein said shape information decoding means comprises:

a demultiplexing unit for demultiplexing the encoded shape information into encoded block shape information and block classification information representing whether a particular block obtained by segmenting the image signal is outside or inside the image object or on a boundary;

a block shape information decoding unit for decoding the encoded block shape information to generate block shape information; and a shape information integrating unit for referring to the block classification information and the block shape information to generate shape information of the entire image object, and the block classification information and the block shape information comprise the boundary information in said second storage means.

9. An apparatus according to claim 8, wherein said padding means comprises:

an address calculation unit for referring to the block classification information stored in said second storage means, and only when the particular block is on the boundary of the image object, referring to the block shape information stored in said second storage means to calculate an address representing a pixel position in the outer region from the block classification information and the block shape information; and a padding value substitution unit for referring to the image signal stored in said first storage means to calculate a pixel value corresponding to the address, and substituting the pixel value into the address in the image signal stored in said first storage means.

10. An apparatus according to claim 2, wherein said input image encoding means comprises means for segmenting an input image into encoding units, detecting a motion amount between the input image and a reference image for each encoding unit, performing motion compensation using the motion amount to generate a predicted image, and encoding a difference between the predicted image and the input image, and said padding means limits processing to a detection range of the motion amount.

11. An apparatus according to claim 7, wherein said image decoding means comprises means for decoding a motion amount and a difference image for each encoding unit, performing motion compensation using the motion amount to generate a predicted image, and adding the predicted image to the difference image to reconstruct an encoded image, and said padding means limits processing to a detection range of the motion amount.

12. An apparatus according to claim 2, wherein said padding means performs padding region identification processing in processing units of horizontal pixel strings, performs padding value substitution processing for a particular horizontal pixel string having a pixel included in the image object, and then performs padding value substitution processing in processing units of vertical pixel strings for pixels outside the image object to which no padding value is substituted in the padding value substitution processing for the particular horizontal pixel string.

13. An apparatus according to claim 7, wherein said padding means performs padding region identification processing in processing units of horizontal pixel strings, performs padding value substitution processing for a particular horizontal pixel string having a pixel included in the image object, and then performs padding value substitution processing in processing units of vertical pixel strings for pixels outside the image object to which no padding value is substituted in the padding value substitution processing for the particular horizontal pixel string.

14. An apparatus according to claim 12, wherein said padding means performs padding value substitution processing for a plurality of adjacent pixel strings by copying padding values successively in a direction perpendicular to the pixel strings.

15. An apparatus according to claim 13, wherein said padding means performs padding value substitution processing for a plurality of adjacent pixel strings by copying padding values successively in a direction perpendicular to the pixel strings.

16. A moving picture encoding/decoding method comprising:

encoding an input image signal including an image object;

storing the image signal including the image object in a first storage means;

encoding shape information representing a shape of the image object to generate encoded shape information;

generating boundary information representing a boundary position of the image object;

storing the boundary information in a second storage means; and performing first padding processing by identifying an outer region of the image object in the image signal stored in the first storage means on the basis of the boundary information stored in the second storage means, calculating a pixel value to be substituted into the outer region the calculating being performed using information from pixels at the boundary position and from no other pixels of the image object, and substituting the pixel value into the outer region stored in the first storage means referring to a reference image, and decoding encoded image data including the image object to generate a decoded image signal;

storing the decoded image signal in a third storage means;

reading out the image signal from the third storage means as a reference image;

decoding encoded shape information in the reference image to generate shape information;

generating boundary information representing a boundary position of the image object;

storing the boundary information in a fourth storage means; and performing second padding processing by identifying an outer region of the image object in the image signal stored in the third storage means on the basis of the boundary information stored in the fourth storage means, calculating a pixel value to be substituted into the outer region, the calculating being performed using information from pixels at the boundary position and from no other pixels of the image object, and substituting the pixel value into the outer region stored the third stored means.

17. A moving picture encoding method of performing padding processing comprising:

encoding an input image signal including an image object;

storing the image signal including the image object in a first storage means;

encoding shape information representing a shape of the image object to generate encoded shape information;

generating boundary information representing a boundary position of the image object;

storing the boundary information in a second storage means; and performing padding processing by identifying an outer region of the image object in the image signal stored in the first storage means on the basis of the boundary information stored in the second storage means, calculating a pixel value to be substituted into the outer region, the calculating being performed using information from pixels at the boundary position and from no other pixels of the image object and substituting the pixel value into the outer region stored in the first storage means.

18. A method according to claim 17, wherein the encoding comprises:

segmenting the shape information into a plurality of blocks;

referring to the plurality of blocks to generate block classification information representing whether each block is outside or inside the image object or on a boundary;

referring to the block classification information, and when a particular block is on the boundary of the image object, encoding the block shape information associated with the particular block; and multiplexing the block classification information and the encoded block shape information to generate encoded shape information; wherein the block classification information and the block shape information comprise the boundary information in the second storage means.

19. A method according to claim 17, wherein the step padding processing comprises:

referring to the block classification information stored in the second storage means, and only when the particular block is on the boundary of the image object, referring to the block shape information stored in the second storage means to calculate an address representing a pixel position in the outer region from the block classification information and the block shape information; and referring to the image signal stored in the first storage means to calculate a pixel value corresponding to the address, and substituting the pixel value into the address in the image signal stored in the first storage means.

20. A method according to claim 17, wherein the padding processing comprises performing padding region identification processing in processing units of horizontal pixel strings, performing padding value substitution processing for a particular horizontal pixel string having a pixel included in the image object, and then performing padding value substitution processing in processing units of vertical pixel strings for pixels outside the image object to which no padding value is substituted in the padding value substitution processing for the particular horizontal pixel string.

21. A moving picture decoding method of performing padding processing comprising:

referring to a reference image, and decoding encoded image data including the image object to generate a decoded image signal;

storing the decoded image signal in a first storage means;

reading out the image signal stored in the first storage means as a reference image into a next frame decoding means;

decoding encoded shape information in the reference image to generate shape information;

generating boundary information representing a boundary position of the image object;

storing the boundary information in a second storage means; and performing padding processing by identifying the outer region of the image object in the image signal stored in the first storage means on the basis of the boundary information stored in the second storage means, calculating a pixel value to be substituted into the outer region, the calculating being performed using information from pixels at the boundary position and from no other pixels of the image object and substituting the pixel value into the outer region stored in the first storage means.

22. A method according to claim 21, wherein the decoding comprises:

demultiplexing the encoded shape information into encoded block shape information and block classification information representing whether a particular block obtained by segmenting the image signal is outside or inside the image object or on a boundary;

decoding the encoded block shape information to generate block shape information; and referring to the block classification information and the block shape information to generate shape information of the entire image object; wherein the block classification information and the block shape information comprise the boundary information in the second storage means.

23. A method according to claim 21, wherein the padding processing comprises:

referring to the block classification information stored in the second storage means, and only when the particular block is on the boundary of the image object, referring to the block shape information stored in the second storage means to calculate an address representing a pixel position in the outer region from the block classification information and the block shape information; and referring to the image signal stored in the first storage means to calculate a pixel value corresponding to the address, and substituting the pixel value into the address in the image signal stored in the first storage means.

24. A method according to claim 21, wherein the padding processing comprises performing padding region identification processing in processing units of horizontal pixel strings, performing padding value substitution processing for a particular horizontal pixel string having a pixel included in the image object, and then performing padding value substitution processing in processing units of vertical pixel strings for pixels outside the image object to which no padding value is substituted in the padding value substitution processing for the particular horizontal pixel string.

25. A recording medium on which a moving picture encoding/decoding program is recorded, the program comprising:

encoding an input image signal including an image object;

storing the image signal including the image object in a first storage means;

encoding shape information representing a shape of the image object to generate encoded shape information;

generating boundary information representing a boundary position of the image object;

storing the boundary information in second storage means; and performing first padding processing by identifying an outer region of the image object in the image signal stored in the first storage means on the basis of the boundary information stored in the second storage means, calculating a pixel value to be substituted into the outer region, the calculating being performed using information from pixels at the boundary position and from no other pixels of the image object and substituting the pixel value into the outer region stored in the first storage means;

referring to a reference image, and decoding encoded image data including the image object to generate a decoded image signal;

storing the decoded image signal in a third storage means;

reading out the image signal stored in the third storage means as a reference image for a next frame decoding means;

decoding encoded shape information in the reference image to generate shape information;

generating boundary information representing a boundary position of the image object;

storing the boundary information in a fourth storage means; and performing second padding processing by identifying an outer region of the image object in the image signal stored in the third storage means on the basis of the boundary information stored in the fourth storage means, calculating a pixel value to be substituted into the outer region the calculating being performed using information from pixels at the boundary position and from no other pixels of the image object, and substituting the pixel value into the outer region stored in the third storage means.

26. A recording medium on which a moving picture encoding program for performing padding processing is recorded, the moving picture encoding program causing a computer to perform the steps of:

encoding an input image signal including an image object;

storing the image signal including the image object in a first storage means;

encoding shape information representing a shape of the image object to generate encoded shape information;

generating boundary information representing a boundary position of the image object;

storing the boundary information in a second storage means; and performing padding processing by identifying an outer region of the image object in the image signal stored in the first storage means on the basis of the boundary information stored in the second storage means, calculating a pixel value to be substituted into the outer region, the calculating being performed using information from pixels at the boundary position and from no other pixels of the image object and substituting the pixel value into the outer region stored in the first storage means.

27. A recording medium on which a moving picture decoding program for performing padding processing is recorded, the moving picture decoding program causing a computer to perform the steps of:

referring to a reference image, and decoding encoded image data including the image object to generate a decoded image signal;

storing the decoded image signal in a first storage means;

reading out the image signal stored in the first storage means as a reference image in a next frame decoding means;

decoding encoded shape information in the reference image to generate shape information;

generating boundary information representing a boundary position of the image object;

storing the boundary information in a second storage means; and performing padding processing by identifying the outer region of the image object in the image signal stored in the first storage means on the basis of the boundary information stored in the second storage means, calculating a pixel value to be substituted into the outer region, the calculating being performed using information from pixels at the boundary position and from no other pixels of the image object and substituting the pixel value into the outer region stored in the first storage means.

* * * * *